United States Patent [19]

Nossen

[11] Patent Number: 4,833,478
[45] Date of Patent: May 23, 1989

[54] AUTOMATIC DIRECTION FINDER ANTENNA ARRAY

[75] Inventor: Edward J. Nossen, Cherry Hill, N.J.
[73] Assignee: General Electric Company, Camden, N.J.
[21] Appl. No.: 560,218
[22] Filed: Dec. 12, 1983
[51] Int. Cl.$^4$ .............................................. G01S 5/04
[52] U.S. Cl. .................................... 342/435; 342/432
[58] Field of Search ............... 343/432, 433, 435, 430, 343/422; 342/432, 435

[56] References Cited

U.S. PATENT DOCUMENTS

| | | | |
|---|---|---|---|
| 3,774,216 | 11/1973 | Coleman et al. | 343/432 |
| 3,987,446 | 10/1976 | Lipsky. | |
| 4,062,015 | 12/1977 | Litva et al. . | |
| 4,158,843 | 6/1979 | Kuchy | 343/448 |
| 4,163,978 | 8/1979 | Shepherd et al. . | |
| 4,313,117 | 1/1982 | Lipsky | 343/437 |

Primary Examiner—Theodore M. Blum
Attorney, Agent, or Firm—Raymond E. Smiley

[57] ABSTRACT

An automatic direction finder antenna array having a plurality of pairs of oppositely positioned antenna elements arranged radially from a common center with each pair forming a cardioid radiation pattern when energized. Switching apparatus energizes successive antenna pairs to produce a rotating cardioid pattern but with the cardioid being switched back and forth 180° at a higher switching frequency when each pair of antennas is energized during the rotating function. The antenna AX whose output bears the lowest ratio R to the output of its oppositely positioned antenna is determined as well as the antenna AZ having the largest output signal VZ. The precise angle of reception of a received signal is then determined from AX, AZ, and R.

11 Claims, 12 Drawing Sheets

SAMPLING SEQUENCE FOR FRONT/BACK RATIO COMPUTATION
AND ANGULAR SECTOR ALLOCATION

ANTENNA ELEMENTS A1 AND A5
ANTENNA ELEMENTS A2 AND A6
ANTENNA ELEMENTS A3 AND A7
ANTENNA ELEMENTS A4 AND A8

SAMPLING SEQUENCE

| ANTENNA ELEMENTS A1 AND A5 | ANTENNA ELEMENTS A2 AND A6 | ANTENNA ELEMENTS A3 AND A7 | ANTENNA ELEMENTS A4 AND A8 |
|---|---|---|---|

| ROW | A<br>V'1 | B<br>V̄'1 | C<br>V'3 | D<br>V̄'3 | E<br>C1 | F<br>C3' | G<br>V'2 | H<br>V̄'2 | I<br>V'4 | J<br>V̄'4 | K<br>C'2 | L<br>C'4 | M<br>C5 | N<br>AND GATE | O<br>ROM # AND SEGMENT |
|---|---|---|---|---|---|---|---|---|---|---|---|---|---|---|---|
| 1  | X |   | X |   |   | X |   |   |   |   |   |   | X | 520 | 470 ⇒ 0°–22.5° |
| 2  |   |   |   |   | X |   | X |   |   | X |   | X | X | 560 | 471 ⇒ 22.5°–45° |
| 3  |   |   |   |   | X |   | X |   | X |   |   | X | X | 540 | 472 ⇒ 45°–67.5° |
| 4  | X |   | X |   |   |   |   |   | X |   |   |   | X | 561 | 473 ⇒ 67.5°–90° |
| 5  |   |   |   | X |   |   | X | X |   |   |   |   | X | 542 | 474 ⇒ 90°–112.5° |
| 6  |   | X |   | X |   |   |   | X |   |   | X |   | X | 562 | 475 ⇒ 112.5°–135° |
| 7  |   | X |   | X |   | X |   | X | X |   | X |   | X | 522 | 476 ⇒ 135°–157.5° |
| 8  |   |   |   |   |   |   |   |   | X |   |   |   | X | 563 | 477 ⇒ 157.5°–180° |
| 9  |   | X |   |   |   |   |   | X |   |   |   |   | X | 524 | 478 ⇒ 180°–202.5° |
| 10 |   |   | X |   |   |   |   |   |   | X |   |   | X | 564 | 479 ⇒ 202.5°–225° |
| 11 |   |   |   |   |   |   |   |   |   | X | X | X | X | 544 | 480 ⇒ 225°–247.5° |
| 12 | X |   |   |   |   |   |   |   |   | X | X |   | X | 565 | 481 ⇒ 247.5°–270° |
| 13 |   |   | X |   |   |   |   |   |   |   |   |   | X | 546 | 482 ⇒ 270°–292.5° |
| 14 |   |   |   |   |   |   |   | X |   |   | X |   | X | 566 | 483 ⇒ 292.5°–315° |
| 15 |   |   |   |   | X |   | X |   |   |   |   |   | X | 526 | 484 ⇒ 315°–337.5° |
| 16 | X |   |   | X |   | X |   |   |   |   |   |   | X | 567 | 485 ⇒ 337.5°–360° |

MEASUREMENT OF VALUES NEEDED TO COMPUTE CALIBRATION COEFFIENTS

RECEIVER INPUT

| | | |
|---|---|---|
| PEAK VALUE | $S_{(2X-1)}$ | EXP (1) |
| MINIMUM VALUE | $S_{2X} = 0$ | EXP (2) |
| AVERAGE VALUE | $\frac{1}{2} S_{(2X-1)}$ | EXP (3) |
| DYNAMIC COMP. | $\frac{1}{2} S_{(2X-1)}$ | EXP (4) |

FILTER OUTPUT

| | | |
|---|---|---|
| PEAK VALUE | $F_{(2X-1)}$ | EXP (5) |
| MINIMUM VALUE | $F_{2X}$ | EXP (6) |
| AVERAGE VALUE | $\frac{1}{8} \sum_{1}^{4} \left[ F_{(2X-1)} + F_{2X} \right]$ | EXP (7)* |
| DYNAMIC COMP. | $\frac{1}{8} \sum_{1}^{4} \left[ F_{(2X-1)} - F_{2X} \right]$ | EXP (8)* |

COMPUTATION OF CALIBRATION COEFFICIENT

DC GAIN = $K_D$      EXP (9)

AC GAIN = K      EXP (10)

$$\text{AVG} = \frac{1}{2} S_{(2X-1)} = \frac{K_D}{8} \sum_{1}^{4} \left[ F_{(2X-1)} + F_{2X} \right] \quad \text{EXP (11)}$$

$$\text{DYN} = \frac{1}{2} S_{(2X-1)} = \frac{K_D K_A}{8} \sum_{1}^{4} \left[ F_{(2X-1)} - F_{2X} \right] \quad \text{EXP (12)}$$

LOT (11) = (12)

$$\frac{K_D}{8} \sum_{1}^{4} \left[ F_{(2X-1)} + F_{2X} \right] = \frac{K_D K_A}{8} \sum_{1}^{4} \left[ F_{(2X-1)} - F_{2X} \right] \quad \text{EXP (13)}$$

FROM EXP (13)

$$K_A = \frac{\sum_{1}^{4} \left[ F_{(2X-1)} + F_{2X} \right]}{\sum_{1}^{4} \left[ F_{(2X-1)} - F_{2X} \right]} \quad \text{EXP (14)}$$

*DURING THE MEASUREMENT WHEN THE DUMMY LOAD IS NOT USED $$\text{AVERAGE} = \frac{1}{8} \sum_{X=1}^{8} F_X \quad \text{EXP (7A)}$$

$$\text{DYNAMIC} = \frac{1}{8} \left[ \sum_{1}^{4} F_X - \sum_{5}^{8} F_X \right] \quad \text{EXP (8A)}$$

Fig.10

$$S_X = K_D \sum_{1}^{8} \frac{F_X}{8} + K_D K_A \left[ \sum_{1}^{4} \frac{F_X}{8} - \sum_{5}^{8} \frac{F_X}{8} \right] \quad \text{EXP (15)}$$

$$S_{X+4} = K_D \sum_{1}^{8} \frac{F_X}{8} - K_D K_A \left[ \sum_{1}^{4} \frac{F_X}{8} - \sum_{5}^{8} \frac{F_X}{8} \right] \quad \text{EXP (16)}$$

FRONT-TO-BACK RATIO IS:

$$\frac{S_X}{S_{X+4}} = \frac{\sum_{1}^{8} F_X + K_A \left[ \sum_{1}^{4} F_X - \sum_{5}^{8} F_X \right]}{\sum_{1}^{8} F_X - K_A \left[ \sum_{1}^{4} F_X - \sum_{5}^{8} F_X \right]} \quad \text{EXP (17)}$$

COMPUTE RATIO AND LOOK UP ANGLE IN ROM (FIG. 10)

*Fig. 11*

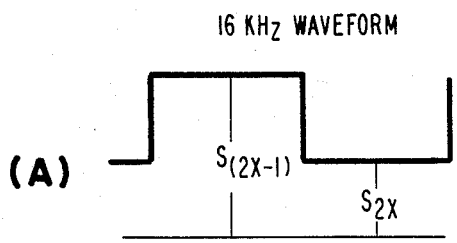

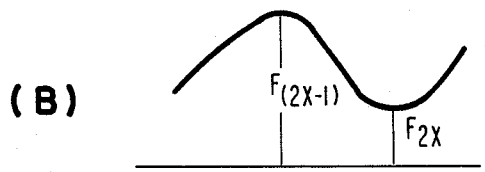

(B)

AUTOMATIC DIRECTION FINDER ANTENNA ARRAY

The U.S. Government has rights in this invention pursuant to Contract No. F 33657-82-C-0526.

This invention relates generally to automatic direction finder systems employing a rotating antenna and more particularly to such a system employing an electronically rotable antenna array in which the direction of the received signal is detected more precisely.

Some prior art automatic direction finders employ a multi-element direction finding antenna array with the antenna elements being fixed in position and with the rotating function being accomplished by sequentially energizing and scanning the individual antenna elements. The phase of the modulating (scanning) waveform in response to an external signal is indicative of the direction of arrival of the external signal. In such prior art devices the effect of sequentially scanning pairs of antennas elements results in a rotating cardioid pattern from which the direction of the received signal is determined.

Assuming distortionless reception, the strength of the received signal is a constant K times the quantity $(1 + \cos\theta)$, where $\theta =$ the angle of the received external signal with respect to the maximum reception (boresight axis). Worded differently, the curve of the cardioid can be expressed as some constant K times the quantity $(1 + \cos\theta)$.

It will be seen that the sensitivity of the antenna is characterized in that the maximum reception of the received signal by the antenna occurs when that portion of the cardioid which varies the least from the axis thereof is presented to the received signal. Furthermore, if the antenna is located on an aircraft, for example, there are reflected signals, such as might occur from a metallic surface, which will function to introduce distortion into the received signal. Such distortion will complicate the determination of the direction of the received signal as compared with distortionless reception wherein the direction of the received signal can be determined by measuring each received value of the received signal and equating it to an angle $\theta$ in accordance with the function $(1 + \cos\theta)$ However, in almost all applications some distortion of the received signal will occur, usually by reflection as indicated above. Adding further to the problem of distortion in prior art structures is the fact that a change in direction of the aircraft will almost always result in a different pattern of reflected signals. Thus, while the antenna can be calibrated to any given position to accommodate reflected signals such calibration must be repeated frequently in order to accommodate the different reflected signals which occur when the position of the aircraft changes.

It is a primary purpose of the present invention to provide an automatic direction finding system in which the distortion otherwise introduced into the signal is substantially eliminated.

In accordance with a preferred form of the invention there is provided an automatic direction finder (ADF) antenna array having a plurality of pairs of oppositely positioned antenna elements extending radially from a common center with each pair forming a cardioid radiation pattern when energized. Switching means energizes successive pairs of antenna elements at a first rate to produce a rotating cardiod pattern but with the cardioid being switched back and forth 180° at a much higher rate than the first rate during the time that each pair of antenna elements is energized during the rotating function. Logic is provided to determine the particular antenna element AX whose output bears the lowest ratio R to the output of its oppositely positioned antenna element as well as the antenna element AZ having the largest individual output signal VZ. Other logic including a look-up table is provided to determine the precise angle of reception of an externally received signal from the determinations of AX, AZ, and R.

In the drawings:

FIG. 9 is a truth table showing the various combinations of connections of FIG. 10;

FIG. 10 shows the various formulae employed in computing the calibration coefficients needed to correct for distortion in the system;

FIG. 11 is another set of formulae employed to compute front-to-back signal amplitude ratios of each pair of oppositely positioned antenna elements;

FIG. 12 shows a theoretical square wave input signal (A) and the resultant distorted and delayed output signal (B) of the system;

Figure 1:
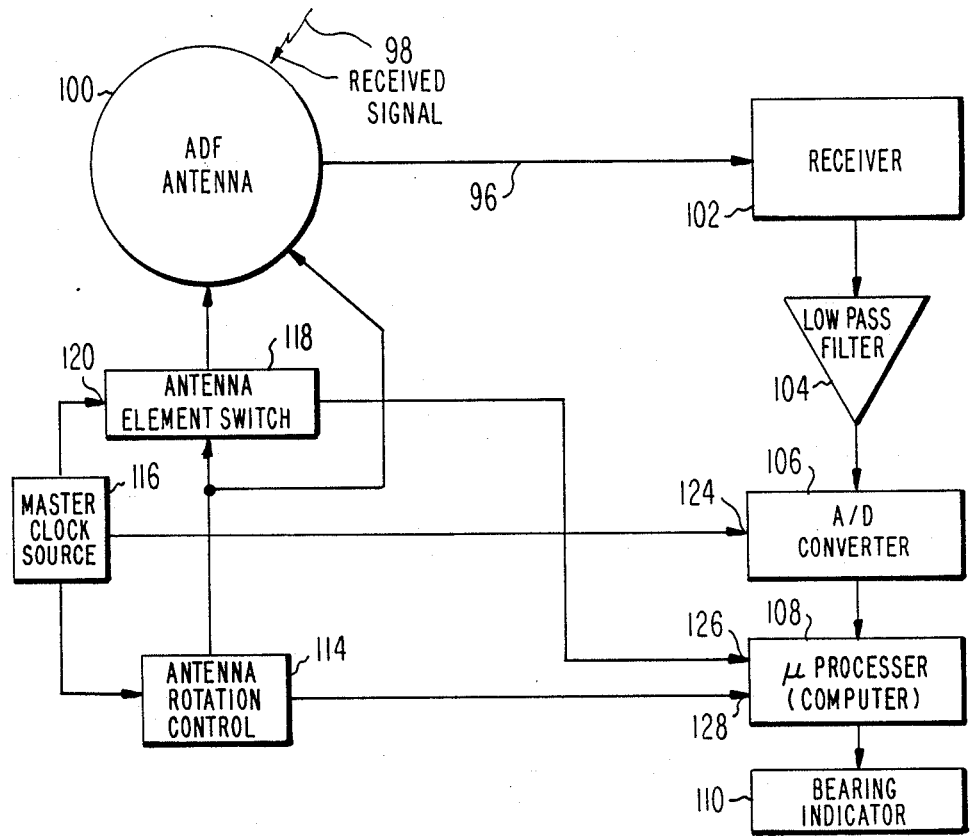
FIG. 1 is an overall block diagram of the invention.

Referring now to FIG. 1 an external signal 98 is received from some distant point such as a ship at sea. The overall purpose of the structure shown in FIG. 1 is to determine the directional location of the source of this signal. Antenna array 100, which can be the antenna array shown in FIGS. 14 and 15 herein, functions to provide what is, in effect, a rotating cardioid radiation pattern. The measured strength of the received signal, as detected by the antenna array 100, will vary with the position of the rotating cardioid pattern. A receiver 102 receives the output signal of antenna array 100 and supplies it through low pass filter 104 to an analog-to-digital (A/D) converter 106 whose digital output is controlled by the output of master clock 116 which is supplied to input 124 of A/D converter 106.

The digital output signal of A/D converter 106 is supplied to a microprocessor 108 which determines the maximum signal detected by antenna array 100 from the received signal 98 and relates such maximum value to the angular position of antenna array 100 and then supplies a signal to bearing indicator 110, which can be a digital output or an optical display, and which shows the bearing of the received signal 98.

Antenna rotation control logic 114 responds to clock pulses from master clock source 116 to energize oppositely positioned pairs of antenna elements in antenna array 100 in some predetermined order such as sequentially clockwise, sequentially counter-clockwise, or periodically reversing betwen clockwise and counter-clockwise modes of rotation.

Figure 6:
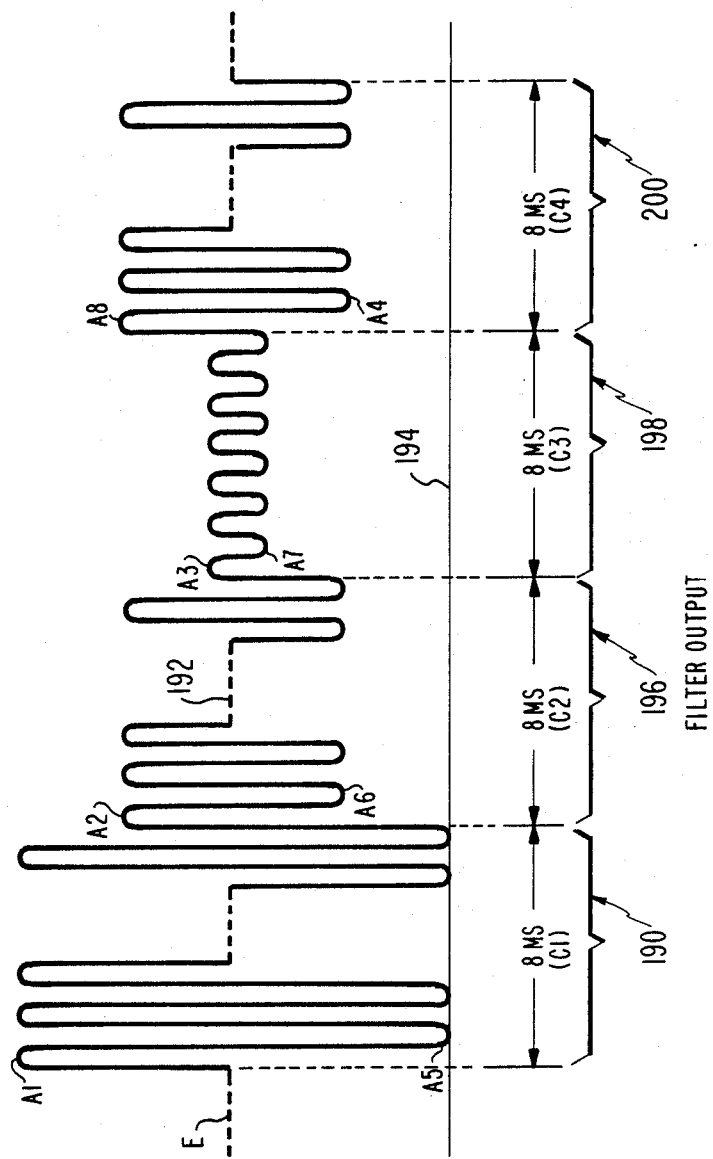
FIG. 6 shows the signal outputs of the antenna arrangement of FIG. 4 when the two antenna elements of each individual pair of oppositely positioned antenna elements are switched back and forth a number of times during the energization of each such pair of oppositely positioned antenna elements in a predetermined sequential pattern.

As each pair of oppositely positioned pairs of antenna elements are selected they are alternately switched back and forth by antenna element switch 118 to cause the cardioid pattern generated thereby to be switched back and forth by 180°. Depending on the position of the cardioid with respect to the received signal 98 of FIG. 1 the output signal generated by antenna array 100 and supplied to receiver 102 can vary from an alternating signal of relatively large amplitude to a signal approaching a dc value E as indicated in FIG. 6.

Figure 3:
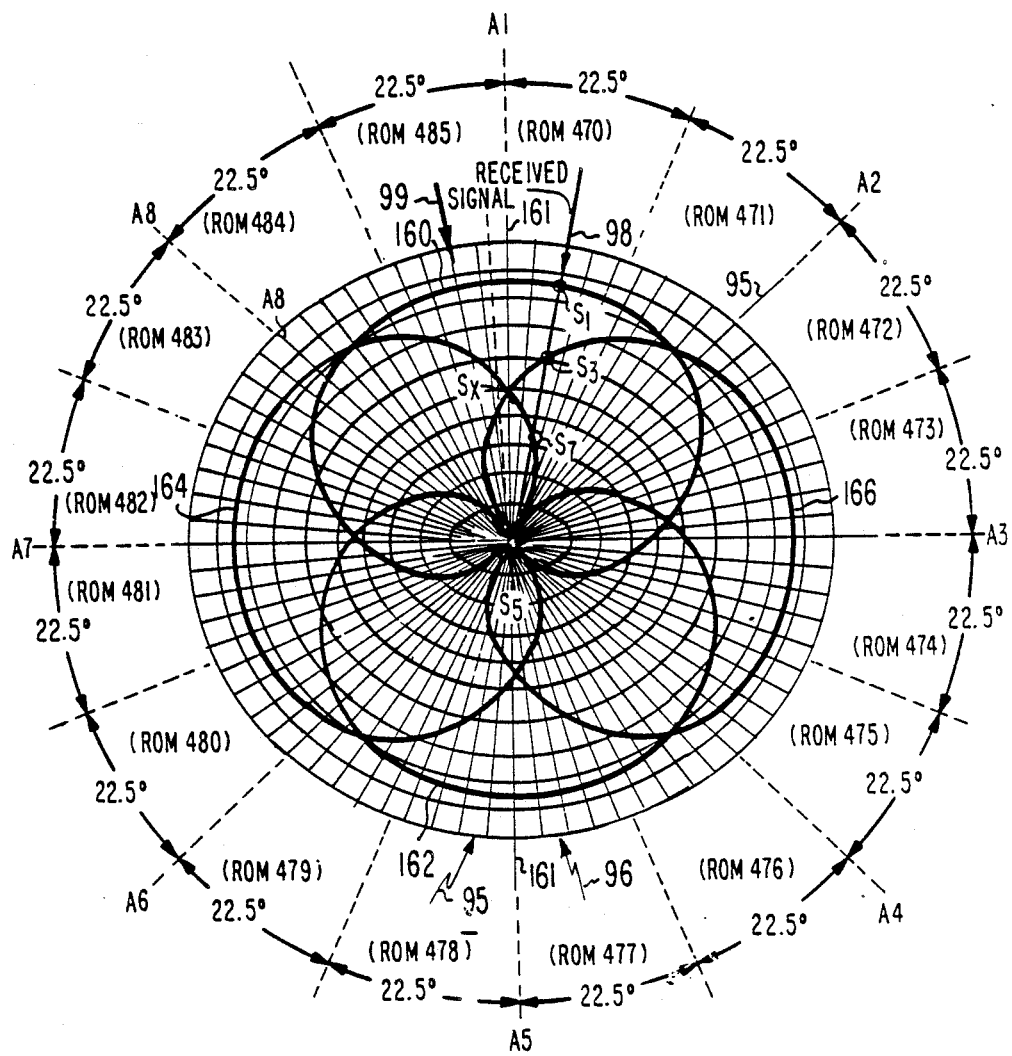
FIG. 3 is another set of cardioid patterns shown at different positions around the receiving antenna array.
Figure 4:
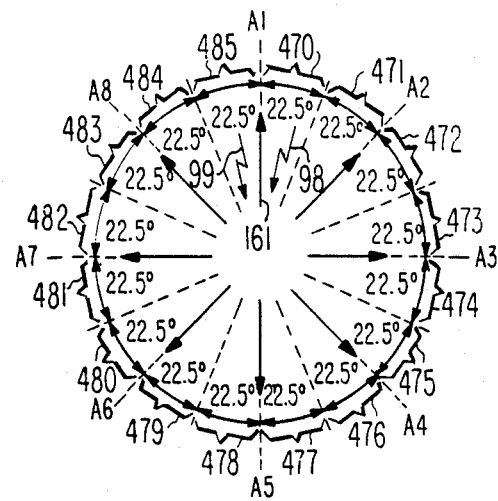
FIG. 4 is a vector type diagram and a bar chart showing the sampling sequence for the four oppositely positioned pairs of antenna elements of an eight element antenna system.

Referring now to FIG. 4 there is shown the sampling sequence for an antenna comprising four pairs of oppositely positioned antenna radiation elements A1–A5, A2–A6, A3–A7, and A4–A8. It is understood that these pairs of antenna elements are, in fact, physically fixed in position and that the radiation pattern is rotated by sequentially and electronically changing the energization from one pair to the next pair as, for example, energizing the pair of antenna elements A1 and A5, then energizing elements A2 and A6, then A3 and A7, then A4 and A8, and then repeating the sequence, if desired. An alternative to repeating the sequence could be continuing the energization around through the pairs of antenna elements A5 and A1, A6 and A2, A7 and A3, and finally A8 and A4. The received signal is designated by reference character 98 to correspond to the received signal 98 of FIG. 1 and can be seen to be received in the first 22.5° segment 470 measured clockwise from the reference line 161 of FIG. 3.

A sampling sequence is shown in the bar timing diagram 180 of FIG. 4. It can be seen that the pairs of antenna elements are each energized in the sequences shown for a period of 8 milliseconds. During each of such 8 millisecond periods the two antenna elements of the sequenced pair are alternately energized back and forth, in response to, for example, the 8 KHz square wave 182 of FIG. 5B which is generated typically by a 16 KHz clock pulse (FIG. 5A) supplied from master clock 116 of FIG. 1 to the antenna element switch 120 of FIG. 1.

Assume, for purposes of discussion, that antenna elements A1 and A5 are currently being selected and switched back and forth. Such antenna elements produce a cardioid pattern which is flipped back and forth 180° at each successive switching. In FIG. 3 the cardioids 160 and 162 represent the cardioid patterns generated by the pair of antenna elements A1 and A5 (FIG. 4) as they are switched back and forth. The received signal is again represented by reference character 98 (in FIG. 3, 98 represents the direction of peak signal strength of the received signal) and can be see to intercept cardioid patterns 160 and 162 at points $S_1$ and $S_5$ (near the center of FIG. 3). It is apparent that a relatively large signal is detected at the intersection $S_1$ and a relatively small signal is detected at the intersection $S_5$ when antenna elements A1 and A5 are being switched. The resultant signal generated at the output 96 of antenna 100 of FIG. 1 is represented by the portion 190 of the curve of FIG. 6 with the high amplitude being detected by antenna A1 and the small amplitude being detected by antenna element A5 when the cardioid pattern flips between the positions represented by the cardioid patterns 160 and 162 of FIG. 3.

The peak plus and minus values shown in portion 190 of FIG. 6 are referenced about a dc value 192 (E) with the lowest possible output of antenna 100, receiver 102 and low pass filter 104, being at ground potential, as represented by level 194. It is apparent that the output of antenna array 100 must always be a positive value with the lowest possible output being at ground reference 194 of FIG. 6.

Assume now that the pair of antenna elements A2 and A6, as shown in FIG. 4, is being sequenced and, during such sequencing, elements A2 and A6 are alternately energized. While the cardioid patterns generated by the pair of antenna elements A2 and A6 are not shown in FIG. 3 in order to prevent unnecessary complication of the drawing, the signal generated thereby is shown as the portion 196 of FIG. 6. It can be seen that the maximum and minimum amplitudes of the total signal detected by antenna elements A2 and A6 extend above and below the average dc value 192 by a lesser amount than those detected by antenna elements A1 and A5. The foregoing is due to the fact that antenna elements A2 and A6 produce cardioid patterns whose common axis lies at a greater angular distance 95 (FIG. 3) from the direction of the received signal 98 (FIG. 3) than does the common axis 161 of the cardioid patterns detected by the pair of antenna elements A1 and A5.

The foregoing can be seen more clearly by examining cardioid patterns 164 and 166 of FIG. 3 which are generated by sequencing and switching antenna elements A3 and A7. The resulting detected signal is shown in portion 198 of the waveform of FIG. 6. It can be seen that the difference between the maximum and minimum amplitudes of the signal of portion 198 are much less than those of either portions 190, 196, or 200 of FIG. 6. The foregoing can also be seen by examining the intersection points of cardioids 164 and 166 with the peak signal direction of the received signal 198 (FIG. 3). Such intersection points are designated as points $S_3$ and $S_7$ which represent the signals detected by antenna elements A3 and A7 respectively, as the pair of antenna elements A3 and A7 are switched. Had the received signal arrived directly along the 0° reference angle 161 (FIG. 3) the signals generated by the pair of antenna elements A3 and A7 would have resulted in a dc signal of value E (level 192 of FIG. 6) since the intersection of the received signal with both of the cardioids generated by antenna elements A3 and A7 would have been as represented by the common intersection point $S_X$ of FIG. 3.

However, since the received signal 98 is in fact angularly offset with respect to the vertical line 161 in FIG. 3 the generated waveform shown within portion 198 of FIG. 6 results and has an amplitude proportional to the difference between the intersection points $S_7$ and $S_3$ of FIG. 3.

The pair of antenna elements A4 and A8 produce the output signal shown during portion 200 of FIG. 6 which can be seen to have substantially the same peak-to-peak amplitudes as the signal produced by antenna elements A2 and A6.

It is apparent from FIG. 6 that with the assumed direction of the received signal 98, the antenna output signal having the largest difference in peak-to-peak amplitude is generated by the pair of antenna elements A1 and A5 and the output signal having the smallest difference in peak-to-peak amplitude is generated by antenna elements A3 and A7.

Due to the shape of the cardioid pattern the largest change in amplitude (peak-to-peak amplitude) of the output of a pair of antenna elements with a given change in the angular position of the received signal occurs in that given pair of antenna elements having the smallest peak-to-peak value and is therefore the position of the cardioid which is the most sensitive to changes in the direction of the received signal. In the example being discussed such smallest peak-to-peak amplitude occurs when the antenna elements A3 and A7 are being switched, as shown in portion 198 of FIG. 6. However, the waveform portion 198 of FIG. 6 has an ambiguity in that it can occur at either of two 180° opposed positions of the received signal with respect to the pair of antenna elements A7 and A3.

Such ambiguity can be resolved by determining which one of the eight antenna elements produces the largest output signal. In the example being discussed the largest peak-to-peak output signal is generated when antenna elements A1 and A5 (see portion 190 of FIG. 6) are selected and are being alternately energized. More specifically, with the received signal 98, as shown in FIG. 3, antenna element A1 produces the largest amplitude output signal when it is being energized. It therefore follows that the cardioid pattern 160 of FIG. 3 generated by antenna A1 is most directly facing the peak of the received signal 98. Thus, the determination that antenna element A1 is producing the largest output signal resolves the above-mentioned ambiguity involving antenna elements A3 and A7 since the angular relationship between antenna elements A1 and A5 and antenna elements A3 and A7 is known to be 90°.

A second ambiguity must also be resolved. The second ambiguity can be seen by considering a second possible direction of the received signal. More specifically, the determination that the received signal is being received primarily in the direction of antenna element A1 does not solve the problem as to whether the received signal has an angular displacement to the right (signal 98) or to the left (signal 99) of antenna element A1 as indicated in FIG. 4. Such second ambiguity can be resolved by determining the relative amplitudes of the signals generated by antenna elements A7 and A3 during energization thereof. If antenna element A7 produces the larger output signal then the received signal is as represented by signal 99. If antenna element A3 produces the larger output signal then the received signal is as indicated by signal 98. Since the received signal is, in fact, as represented by signal 98 the antenna element A3 will produce the larger output signal as shown in the portion 198 of the waveform of FIG. 6.

Logic must be provided, therefore, to determine which of the antenna elements of antenna element pair A1 and A5 and also antenna element pair A3 and A7 produce the larger signals. Such logic is shown in FIG. 8 and will be discussed in detail later herein. The logic for determining which pair of antenna elements produces the smallest peak-to-peak ac signal which, in the example being considered, is antenna element pair A3 and A7, is shown in FIG. 7 and will now be considered.

Figure 7:
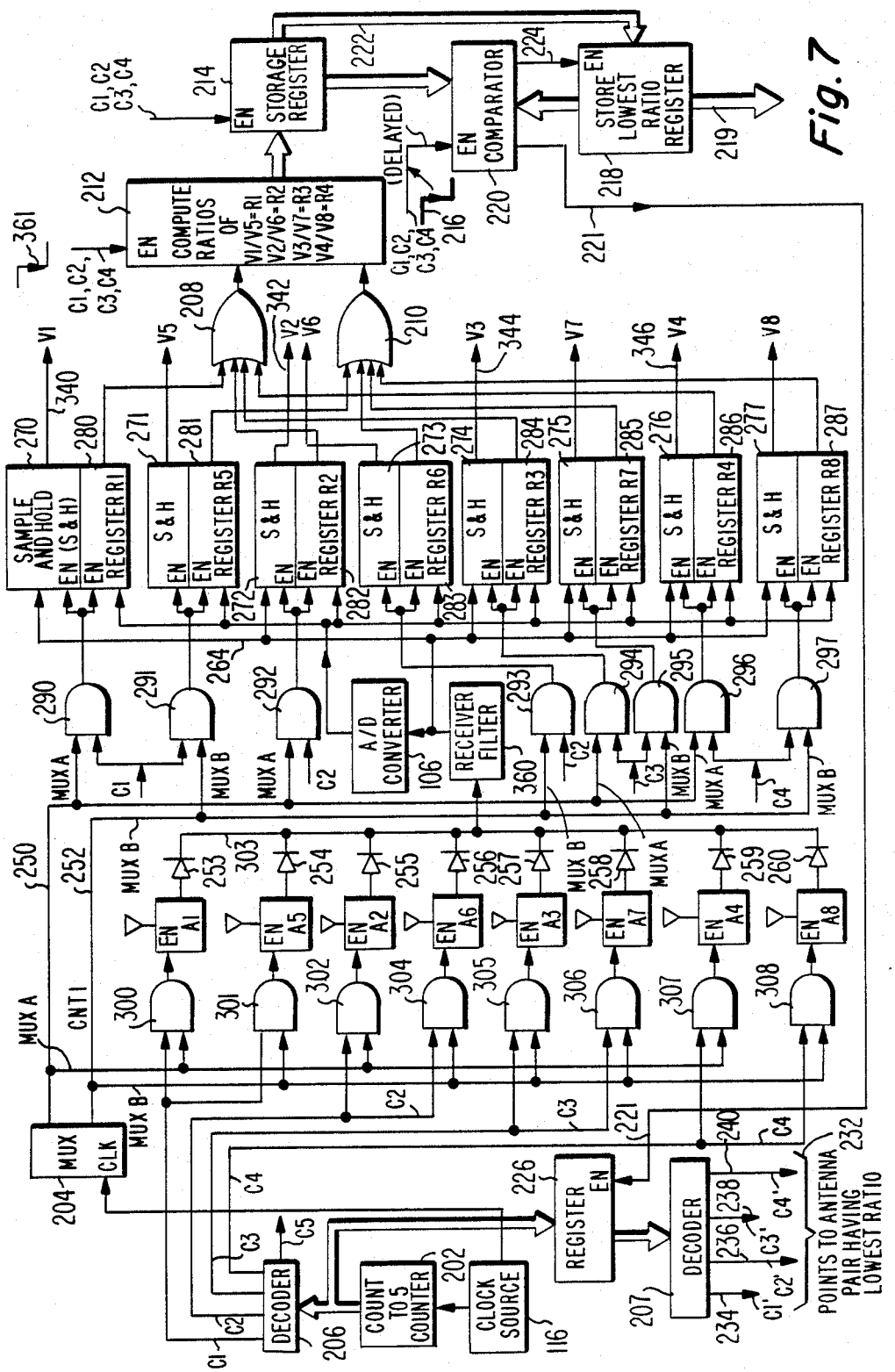
FIG. 7 shows logic for determining which antenna element is most directly receiving the externally received signal.
Figure 8:
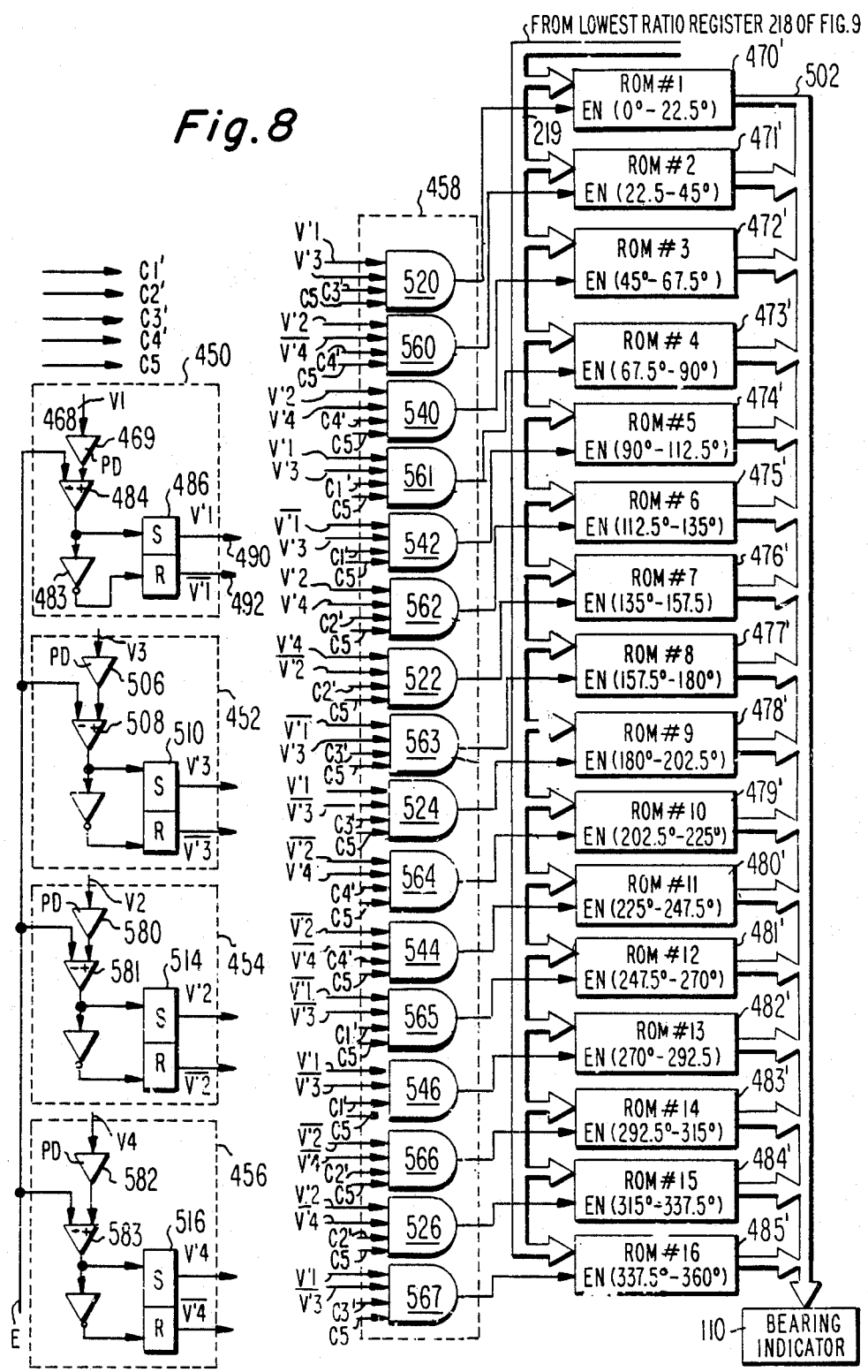
FIG. 8 shows logic for determining the precise angle of reception of the externally received signal after the determination of which antenna element is most directly receiving such externally received signal.

In FIG. 7 the clock pulse source 116 supplies a clock signal both to counter 202 and also to the clock input of multiplexer (MUX) 204. The output of counter 202 is decoded by decoder 206 to sequentially energize the pairs of antenna elements A1–A5, A2–A6, A3–A7, and A4–A8, at which time the cycle repeats and the sequence is repeated. This enabling of the four pairs of antenna is implemented by appropriate logic, to be described later, and is the equivalent of sequencing the entire eight pairs of antenna elements A1–A5, A2–A6, A3–A7, A4–A8, A5–A1, A6–A2, A7–A3, and A8–A4. The sequencing completely through the eight pairs of antennas is unnecessary, however, and would unduly complicate the sequencing function.

Figure 5:
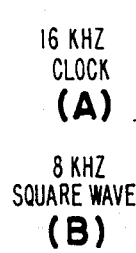
FIG. 5 shows timing diagrams of the antenna switching time.

As indicated above, the output of clock source 116 is also supplied to MUX 204 which functions to alternately enable (switch) whichever pair of antennas is currently being sequenced. For example, if the pair of antennas A1–A5 is being enabled (sequenced) by the output of decoder 206 then the two outputs MUX A and MUX B of MUX 204 will alternately energize the two antenna elements A1–A5 via the two MUX output leads 250 and 252 at a predetermined rate which, in the example being discussed, can be a 8 KHz rate, as indicated in FIG. 5.

The outputs of the eight antenna elements A1–A8 of FIG. 7 are supplied to a receiver/filter 360 via individual rectifiers 253 to 260, respectively, all of which act together to form an OR gate function. The output of receiver/filter 360 is supplied to sample and hold (S&H) circuits 270–277 inclusively, and also to the input of A/D converter 106. The output of A/D converter 106 is supplied to registers 280 through 287, respectively.

It will be noted that the S&H circuits 270–277 and the registers 280–287 are arranged in pairs to correspond to the pairing of the antenna elements. For example, the outputs of antenna elements A1 and A5 are paired together in that antenna elements A1 and A5 are enabled during C1 and then are multiplexed, i.e., switched back and forth, during C1 by the alternately occuring MUX A and MUX B outputs of MUX 204 via AND gates 300 and 301. Registers 280 and 281 and S&H circuits 270 and 271 are also enabled during C1. The outputs MUX A and MUX B of MUX 204 are applied via AND gates 290 and 291 so that registers 280 and 281 and S&H circuits 270 and 271 will be enabled synchronously with the enablement of the corresponding antenna elements A1 and A5.

Thus, when the MUX A output of MUX 204 of FIG. 7 enables antenna element A1 by supplying a high level signal to the enable input thereof, register 280 and S&H logic 270 are both also enabled to receive, respectively, the outputs of A/D converter 106 and receiver/filter 360. During those alternate times when the MUX B output of MUX 204 is high, antenna element A5 will be energized to supply its output through receiver/filter 360 to S&H logic 271 and then through A/D converter 106 to register 281. It should be remembered that AND gates 290 and 291 are primed during the count period C1 from decoder 206. This is the count period during which antenna elements A1 and A5 are the selected pair.

Similarly, during count period C2 antenna elements A2 and A6 are the selected pair in that AND gates 302 and 304 are primed by C2. Thus the MUX A output of MUX 204 will simultaneously enable antenna elements A2, S&H circuit 272, and register 282 via primed AND gate 292, and during the MUX B output antenna element A6 will be enabled as well as S&H circuit 273 and register 283 via AND gate 293.

In a similar manner, the pair of antenna elements A3 and A7 will be next alternately enabled during count period C3 via primed AND gates 305 and 306 of FIG. 7 along with the concurrent alternate enabling of S&H circuits 274 and 275 and registers 284 and 285 via primed AND gates 294 and 295. Finally, antenna elements A4 and A8 will be alternately switched on by MUX A and MUX B during count period C4 via primed AND gates 307 and 308. S&H circuits 276 and 277 and registers 286 and 287 will also be alternately enabled via primed AND gates 296 and 297 to receive the analog and digital outputs of antenna elements A4 and A8, respectively, through receiver/filter 360 and A/D converter 106.

At the end of count period C4, the S&H circuits 270-277 will respectively hold the analog outputs of antenna elements A1, A5, A2, A6, A3, A7, A4, and A8, respectively, and registers 280-287 will hold the digitized outputs of antenna elements A1, A5, A2, A6, A3, A7, A4, and A8, respectively.

The output signals of S&H circuits 270-277, designated V1-V8, are supplied to the logic arrangement shown in FIG. 8, to be described in detail later, and are employed primarily to determine which antenna element of each of the four pairs of antenna elements is generating the larger signal.

The digitized outputs of antenna elements A1-A8, stored in registers 280-287, are employed to determine the ratio of the outputs of the pairs of antenna elements. For this computation the output of antenna element A1 is designated as D1, the output of antenna element A2 as D2, the output of antenna element A3 as D3, etc., through antenna element A8. The digitized form of outputs D1 through D4 are supplied from registers 280, 282, 284, and 286 to the four inputs of OR gate 208, the output of which is supplied to a first input of computer logic 212. The D outputs of the remaining registers 281, 283, 285, and 287 are supplied to the four inputs of OR gate 210, the output of which is supplied to a second input of computer 212. Computer 212 is energized at the trailing edges (361) of outputs C1, C2, C3, and C4 of decoder 206 to successively compute the ratios of D1/D5=R1, D2/D6=R2, D3/D7=R3, and D4/D8=R4, respectively.

It is apparent that an appropriate buffer storage means (not shown) can be inserted between OR gates 208 and 210 and computer 212 so that new D values of the outputs of antenna elements A1-A8 can be stored while the old values previously determined can be computed in computer 212.

As each of the four ratios R1, R2, R3, and R4, is computed at the trailing edges of C1, C2, C3, and C4, it is supplied to storage register 214. As each of the ratios R1-R4 is supplied to register 214, it is compared with a value already stored in register 218. More specifically, at the beginning of the computation of R1, a predetermined value is preset in register 218 which is greater than any possible value of R1. Thus, the first ratio R1 is compared in comparator 220 with the high value preset in register 218 and since it is lower than the preset value it (R1) will be transferred to and stored in register 218 via bus 222. The next ratio R2 is then entered into register 214 and compared in comparator 220 with the value R1 stored in register 218. If R2 is less than R1, then R2 replaces R1 in register 218. If R2 is greater than R1 then R2 is not stored in register 218, but at the trailing edge of the count C3 is replaced in register 214 by the next R value, R3. Assume that R2 is greater than R1 so that R1 remains in register 218.

In FIG. 7 a comparison of R3 with the value R1 in register 218 is then made by comparator 220 and if it is less than R1 it (R3) is stored in register 218. Assume for purposes of discussion that R3 is less than R1 so that R3 becomes stored in register 218.

The last ratio value R4 is then entered into register 214 at the trailing edge of C4, and is compared in comparator 220 with value R3 stored in register 218. Assume value R4 to be greater than R3 so that R3 remains stored in register 218 at the end of this portion of the signal processing.

The comparison function in comparator 220 is initiated by the slightly delayed trailing edges of C1, C2, C3, and C4, which are supplied to the enable input of comparator 220.

Thus, the lowest value of R has been determined to be R3 and is stored in register 218 of FIG. 7. The logic described so far, however, does not identify which particular pair of antenna elements produced this lowest ratio. The identification of such particular pair of antenna elements is effected by the logic including register 226 and decoder 207 of FIG. 7. More specifically, as the counter 202 advances through its five counts in a cyclical manner the output count will be presented to the input of register 226 in binary form. Each time a transfer is made from storage register 214 to register 218 the register 226 is enabled via lead 221 to store the then presented count of counter 202. Decoder 207 responds to such stored count to supply a stored output count signal C1', C2', C3', or C4' on one of its four output leads 234, 236, 238, or 240 thereof indicating the stored count value in register 226.

The four output leads 234, 236, 238, and 240 of decoder 206, on which appear the stored counts one through four (C1', C2', C3', and C4') respectively, are continued in FIG. 8 and are identified by the same reference characters 234, 236, 238, and 240.

Also extending to FIG. 8 from FIG. 7 are the four leads 340, 342, 344, and 346 on which appear the detected and amplified outputs of antenna elements A1, A2, A3, and A4, identified as outputs V1, V2, V3, and V4. These four outputs are supplied to peak detectors (PD) 469, 506, 580, and 582, respectively, of FIG. 8. These peak detectors are required since it is the maximum values of the signals V1, V2, V3, and V4 that are to be employed in the logic to determine the direction of the received signal. The output of the four peak detectors 469, 506, 580, and 582 are supplied respectively to first inputs of difference amplifiers 484, 508, 581, and 583. The dc voltage E (from FIG. 6) is supplied to the negative inputs of the difference amplifiers 484, 508, 581, and 583.

One purpose of the logic of FIG. 8 is to determine which particular antenna element is producing the greatest signal output. It has already been determined, in the example being discussed, that antenna elements A3 and A7 are producing the smallest peak-to-peak output signal, as shown by portion 198 of FIG. 6. The antenna elements A3 and A7 are identified by the stored count of 3 (C3') appearing at the output of decoder 207 (FIG. 7), as discussed above.

Since it is known that the maximum peak-to-peak amplitude will occur between that pair of antenna elements which is 90° removed from antenna elements A3 and A7 and further that such 90° removed pair of antenna elements is, in fact, the pair of antenna elements A1 and A5, it follows that the logic must now determine which of the two antenna segments A1 and A5 is producing the largest output signal. Thus, the output of antenna element A1, which has a value V1, is supplied via peak detector 469 to the positive input of difference amplifier 484. If V1 is greater than E, which means that V1>V5 and is in fact the larger of the two antenna element output signals, flip-flop 486 will be set, thereby supplying the set output signal V'1 to one input of AND gate 520. The stored count of 3 (C3') from decoder 207 of FIG. 7 has already primed a second input of AND gate 520.

It should be noted that C3' will remain supplied to an input of AND gate 520 until the next count of 1 occurs from decoder 206 of FIG. 7. The count of 5 (C5) output of decoder 206 (FIG. 7) also will remain supplied to an input of AND gate 520 until such next count of 1 (C1). Thus C3' and C5 will coincide during the period of C5.

The count of 5 from decoder 206 of FIG. 7 is not supplied either to register 226 (FIG. 7) or to the enable inputs of any of the antenna segments. Such count of 5 is a fifth time period C5 during which the contents of the lowest ratio storage register 218 is examined by the system and the angle of the incoming signal determined and supplied to a suitable bearing indicator 110 shown in FIG. 8.

Since V3 has been determined to be greater than V7, as discussed above, the action of peak detector 506 and difference amplifier 508 will result in the setting of flip-flop 510. The set output V'3 of flip-flop 510 is the fourth input to AND gate 520 which will then supply a high level signal to enable ROM 470A which represents a 22.5° angular segment of the total 360° of possible reception and corresponds to the 22.5° segment 470 of FIG. 4.

It will be recalled, as discussed above, that the received signal 98 of FIG. 3 is being received in the first 22.5° segment 470 of the diagram of FIG. 3, measured from the vertical zero reference line 161 and extending clockwise around the diagram. The ratio R3 will vary in accordance with the particular point at which the received signal is being received in the first 22.5° segment 470 defined above. The precision with which the angle of the received signal is to be measured determines the number of the word locations required in each of the ROMS 470'—485'. For example, if it is desired to determine such angle in angular minutes the ROM 470A would need 60×22.5 or 1,350 word locations, one for each minute in the 22.5° segment.

Assume now that the incoming signal is coming in at the angular direction indicated by reference character 99 of FIG. 3. It is to be noted that the angle of reception of the received signals 98 and 99 is assumed to be the same with respect to the zero reference 161 of FIG. 3 except that signal 99 leads and signal 98 lags such zero reference 161.

Thus, having determined the values of V1, V2, V3, and V4 with the logic of FIG. 7, and also having determined which pair of antennas has the lowest ratio, as indicated by the output of decoder 207 of FIG. 7, it is possible to determine, as discussed above with respect to FIG. 7 and 8, which segment of the sixteen 22.5° segments (FIG. 3) is receiving the received signal. Once the proper 22.5° segment is determined it is then possible to further define the peak signal direction (within a predetermined tolerance) of the received signal by more closely examining the lowest ratio which is stored in register 218 of FIG. 7.

The logic for determining which of the sixteen 22.5° segments is receiving the received signal (and which of the ROMs 470A–485A contains such 22.5° segment) is shown in FIG. 8 and specifically includes the logic within the dotted line blocks 450, 452, 454, and 456 and also the AND gates within the large vertical dotted block 458. The sixteen 22.5° segments into which the antenna reception is divided are each represented by the contents of one of the sixteen ROMS 470A–485A. Once a particular ROM representing a given 22.5° segment is selected, as for example, ROM 470A, which covers the 22.5° segment extending from 0°–22.5° measured from the 0° vertical angular position 161 of FIG. 3, then the lowest ratio value, which is stored in register 218 of FIG. 7, is supplied thereto via bus 219 (FIG. 8). Such lowest ratio value is, in fact, an address and selects one of the word locations in the ROM 470A. The contents of such ROM location is the precise angle (encoded) of direction of the received signal and is supplied to a suitable bearing indicator logic arrangement 110 via bus 502. This bearing indicator logic 110 translates the received signal to a suitable signal for utilization such as in a CRT or a digital display.

Each of the four logic arrangements 450, 452, 454, and 456 are essentially the same except that they respond to different input values. More specifically, logic 450 receives, and interprets, the value V1 from FIG. 7, logic 454 receives and interprets the value V3, logic 454 receives and interprets V2, and logic 456 receives and interprets V4.

As mentioned briefly above, the outputs of the logic arrangements 450, 452, 454, and 456 appear at the outputs of flip-flops 486, 510, 514, and 516, respectively, and represent a stored determination as to whether the values of V1–V4 are greater or less than the dc value 192 (E) of FIG. 6. Thus, within block 450, for example, flip-flop 486 will either be in a set condition or a reset condition after the sequencing and switching of the four pairs of antennas through one cycle. It can be seen from FIG. 7 that if V1, which is derived from segment 190 of FIG. 6, is a result of the signal generated by antenna element A1, then antenna element A1 will generate a larger signal than the reference dc signal E of FIGS. 6 and 8. Such peak amplitude V1 is measured by the peak amplitude detector 469 of FIG. 8 and supplied to difference amplifier 484. The dc value E of FIG. 6 is supplied to the negative input of difference amplifier 484. Since V1 is larger than E the output of difference amplifier 484 will be a high level signal which will set flip-flop 486 to produce a set output designated as V'1 and appearing on the output lead 490.

Assume now that the strongest received signal is received by antenna element A5 which is paired with antenna element A1. Under such condition, antenna element A5 will generate the largest output signal and antenna element A1 will generate the smallest, which is a condition opposite to that shown in segment 190 of FIG. 6.

In the event of such a reception, however, the peak value V1 generated by antenna element A1 will now be close to zero so that the output of peak amplitude detector 469 will be less than E. In response to such inputs the difference amplifier 484 will generate a low level signal which will be inverted by inverter 483 to reset flip-flop 486, thereby producing a high level signal designated $\overline{V'1}$ on the reset output lead 492 of flip-flop 486.

It is now apparent that the logic of FIG. 8 has resolved the general direction of the received signal by determining which of V1 or V5 is the larger. If V1 is the larger then flip-flop 486 is set. If V5 is the larger then flip-flop 486 is reset, indicating that V1 is the smaller of V1 and V5.

In a similar manner the output V3 from antenna A3 is supplied through peak detector 506 to difference amplifier 508 where it is compared with the dc value 192 (E) of FIG. 6. The output of flip-flop 510 then indicates whether V3 is larger or smaller than the dc value E of FIG. 6. Similarly, a determination as whether the values V2 and V4 are larger or smaller than E is made with the results appearing at the output of the two flip-flops 514 and 516, respectively.

Each of the above determinations is made during the time that the particular pair of antenna elements is energized. Thus, the determination of the relative value V1 is made during the time period 190 of FIG. 6 (C1), and the determination of the relative values of V2, V3, and V4 are made during the time periods 196 (C2), 198 (C3), and 200 (C4) of FIG. 6.

As mentioned above, these determinations are stored by means of the flip-flops 486, 510, 514, and 516. The outputs of these flip-flops are detected by the AND gates within block 458 (FIG. 8) during time period C5 which occurs after each count cycle of counts 1 through 4 of counter 202 (FIG. 7).

As noted above, the stored count output (C1'-C') of decoder 207 (FIG. 7) at the end of the count of four of counter 202 and during the count period C5 represents that particular pair of antenna elements whose outputs produced the smallest ratio as computed by computer 212 of FIG. 7.

As will be recalled, in the example being discussed, antenna elements A3 and A7 produce the smallest ratio R3 as indicated in portion 198 of FIG. 6. This ratio is computed during the period C3. From an examination of FIGS. 3 and 4 it can be seen that antenna elements A3 and A7 will produce the smallest ratio under four different conditions, as follows. Two of these four conditions occur when the recived signal (either signal 98 or 99) is coming in towards antenna element A1 and either lagging or leading the zero degree reference line 161. The other two conditions are when the received signal (either signal 93 or 96) is coming in towards antenna element 5 (at the bottom of FIG. 3) and either leading or lagging the 180 degree reference line 161. It should be observed also that these four conditions represent the received signal lying in four different 22.5° segments, including 22.5° segments 485, 470, 477, and 478, as shown in FIG. 4.

As indicated above, the identification of the proper one of these four 22.5° segments is determined by the logic of FIG. 8 which examines combinations of the values of V'1, $\overline{V'1}$, V'3, and $\overline{V'3}$, the outputs of flip-flops 486, 510, 514, and 516, and the output of decoder 207 (FIG. 7).

As a specific example, when the received signal is as represented by reference character 98, the pair of antenna elements A1 and A5 will generate the largest ratio with antenna element A1 having a value which is larger than the dc reference 192 (E) of FIG. 6. This fact establishes that the signal is coming in towards antenna element A1. However, it does not resolve the question as to whether the signal is coming in leading or lagging the zero reference line 161. The latter ambiguity is resolved by examining the value of V'3. If the received signal is as indicated by reference character 98 then it can be seen that V'3 (the set output of flip-flop 510) will be a high level signal and $\overline{V'3}$ will be a low level signal. If the signal is coming in as represented by reference character 99, then it can be seen that $\overline{V'3}$ will be high and V'3 low. Thus if the lowest ratio is produced by antenna element pairs A3 and A7, and V'3 is high and $\overline{V'3}$ low, it will then be established that the incoming signal is being received in the first 22.5° segment (FIG. 4) positioned clockwise of zero reference line 161.

When the received signal is as shown by line 98, both V'1 and V'3 are high level signals and both represent outputs of antennas A1 and A3 which are greater than E. Thus V'1, V'3, C3' and C5, all supplied to the four inputs of AND gate 520 (FIG. 8), are all high level signals and AND gate 520 will respond thereto to output a high level signal to enable ROM 470' which contains the angular segment from 0°-22.5°.

At the same time the computed ratio stored in register 218 of FIG. 7 is supplied to the input of ROM 470' via bus 219 to select one of the memory locations therein in accordance with the value of such ratio. The contents of the selected word location of ROM 470' is the precise angle (encoded) at which the received signal is being received.

It will be noted that four AND gates 520, 563, 524 and 567 all have a stored count of C3' supplied thereto. However, in three of these four cases the right combination of V'1, $\overline{V'1}$, and V'3, $\overline{V'3}$ values is not supplied thereto so that only AND gate 520 is enabled.

Each of the remaining fifteen ROMS 471' to 485' of FIG. 8 are selected in much the same manner as determined by the proper inputs being supplied to a selected one of the AND gates in block 458 of FIG. 8.

As discussed above, it is apparent that with the various combinations of V'1, $\overline{V'1}$, V3 V'3 and the count C3'four possible 22.5° ROM segments can be selected, namely, any one of the four ROMS 470', 477', 478', and 485', which correspond to 22.5° segments 470, 477, 478, and 485 of FIG. 4.

Consider now the case where the received signal is directed primarily either towards antenna A3 or antenna A7 and where the lowest computed ratio is derived from the outputs of antennas A1 and A5, which will occur during the count of 1 (C1) of the output of decoder 206. The count of 1 defines the period during which antennas A1 and A5 are energized and being switched. Under these conditions, the received signal is being received by one of the 22.5° segments 473, 474, 481, and 482 of FIG. 4. The particular segment most directly receiving the external signal is determined by determining which of V'1 or $\overline{V'1}$ and V'3 or $\overline{V'3}$ is the greater (a high level signal) and supplying the various possible results thereof to AND gates 561, 542, 565, and 546 of the group of AND gates 458 along with the count C1. The proper ROM of ROMS 470'–485' will be thereby enabled.

It can be seen in FIG. 8 that the four ROMs which can be enabled by AND gates 561, 542, 565, and 546 are ROMS 473', 474', 481', and 482', respectively, which correspond to 22.5° segments 473, 474, 481, and 482 of FIG. 4.

Thus the eight ROMS 470', 477', 478', 485', 473', 474', 481', and 482' of the sixteen ROMS can be accessed by various combinations of V'1, $\overline{V'1}$, V'3, and $\overline{V'3}$ and the stored counts C3' or C1', and the count C5. These various combinations of inputs to AND gates 458 of FIG. 8 are shown in rows 2, 4, 5, 8, 9, 12, 13, and 16 of the chart of FIG. 9. In FIG. 9, the various connections, indicated by "x" marks, will enable the AND gates indicated in Column N to selectively access the ROMs and the corresponding 22.5° segment indicated in Column 0.

While the above discussion of the logic of FIG. 8 deals with the accessing of the proper ROM when the external signal is received most directly by antennas 1, 5, 3, or 7, it does not directly address the situation where the external signal is most directly received by antennas 2, 4, 6, or 8. To provide for such an occurrence the inputs V2 and V4 supplied to the peak amplitude detectors 580 and 582 of FIG. 8 are derived by the logic of FIG. 7 in the same manner as the values V1 and V3 are derived and represent the output values of antennas A2 and A4, respectively. The signal levels V'2, $\overline{V'2}$, V'4, and $\overline{V'4}$, are determined in much the same manner as are the signal levels of V'1, $\overline{V'1}$, V'3, and $\overline{V'3}$ and appear at the output of the two flip-flops 514 and 516 of FIG. 8. The various combinations of V'2, $\overline{V'2}$, V'4, and $\overline{V'4}$, are supplied to the inputs of AND gates 560, 540, 562, 522, 564, 544, 566, and 526 of FIG. 8 along with either C2'2 or C4', and with C5 in all cases.

The specific connections of V'2, $\overline{V'2}$, V'4, and $\overline{V'4}$ made to the above-mentioned AND gates are shown in FIG. 8 and also are shown in the chart of FIG. 9.

while the cardioids shown in FIG. 3 can be expressed as the well known cardiod function $(1+\cos\theta)$ where $\theta$ is the angular displacement from the zero degree reference line 161 of FIG. 3, certain distortions are introduced into the received signal for various reasons, thus making the use of the function $(1+\cos\theta)$ not entirely accurate. More specifically, the output signal from each antenna element at the output of the receiver depends upon a number of factors in the processing sequence. Therefore, the front-to-back ratio of the outputs of antenna elements A3 and A5, for example, cannot ordinariliy be directly used to obtain accurate results. A calibration coefficient is needed. This calibration coefficient can be determined by the logic shown in FIG. 13, to be discussed in more detail later herein. Such calibration coefficient is required to define the change in amplitude and frequency response of the antenna output signals as they pass through the receiver/filter 360 of FIG. 13. The inherent time delay through receiver/filter 360 must also be calibrated to allow synchronous processing. FIG. 12 illustrates how the envelope of the switched signal is changed between the receiver input and output.

As will be seen more clearly from the following discussion, calibration of all parameters is accomplished automatically in the system ratio computer 212 by switching the antennas between active antenna elements A1, A3, A5, and A7 and a dummy load 636 by means of switching logic 631 of (FIG. 13) at periodic time intervals.

The calibration procedure is generally as follows. The MUX A output of MUX 204, assumed to be an 8 KHz signal, passes through primed AND gate 630 to enable MUX 631 and thereby alternately connect receiver/filter 360 to dummy load 636 and to the common output 303 of antenna elements A1, A3, A5, and A7. The signal received from one antenna element has a peak total amplitude of $S_{(2x-1)}$ as shown in Expression 1 of FIG. 10, which includes both dc and ac components, while during the period when the dummy load 636 is switched on, the ac signal amplitude is zero, as shown by Expression 2. At the output of receiver/filter 360, a filtered waveform (FIG. 12B) with the peak value of $F_{(2x-1)}$ and a minimun value of $F_{2x}$ will result from the above input signal with a time displacement with respect to the input square wave of FIG. 12A due to the delay in the receiver/filter 360.

Figure 13:
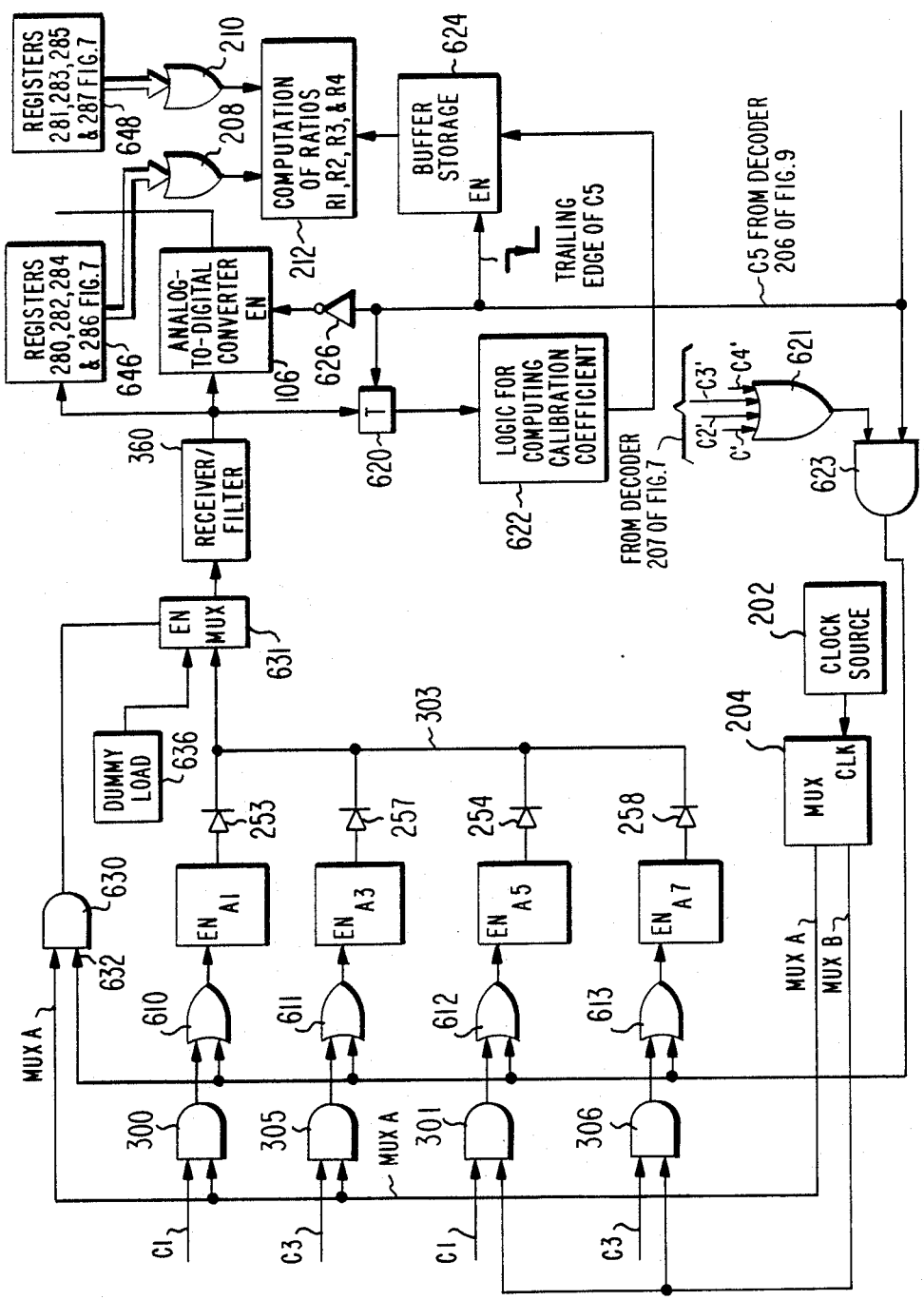
FIG. 13 is a combination block and logic diagram suitable for computing the calibration constant.

The mathematics of the calibration procedure are illustrated in Expressions 1 through 14 of FIG. 10. In Expressions 1 and 2 the peak and minimum values of the receiver input are shown with average value of $\frac{1}{2}S_{(2x-1)}$ as in Expression 3. The dynamic component of the input to the receiver/filter 360 of FIG. 13 is as shown by Expression 4. It is $\pm\frac{1}{2}S_{(2x-1)}$.

At the output of receiver/filter 360 of FIG. 13 the peak and minimum values are shown as $F_{(2x-1)}$ and $F_{2x}$ in Expressions 5 and 6. The average value over 8 cycles is shown in Expression 7 and the dynamic component over 8 cycles is shown in Expression 8.

It can be seen that the dc output of receiver/filter 360 (FIG. 13) multiplied by some constant $K_D$ is equal to the average dc input $\frac{1}{2}S_{(2x-1)}$ as shown in Expressions 3 and 11. The ac component at the input of receiver/filter 360, is equivalent to the output of receiver/filter 360 (FIG. 13) multiplied by a constant $K_A$ of Expression 10. This is also equal to the average input $\frac{1}{2}S_{(2x-1)}$ to receiver/filter 360, as represented by Expression 3. The dc and ac gain constants $K_D$ and $K_A$ are shown in Expressions 9 and 10.

Thus, the average value $\frac{1}{2}S_{(2x-1)}$ supplied to the input of receiver/filter 360 is equal to the average value at the output of receive/filter 360 multiplied by the constant $K_D$, as shown in Expression 9. Furthermore, $\frac{1}{2}S_{(2x-1)}$ is equal to the dynamic value (Expression 8) at the output of receiver/filter 360 multiplied by the constant $K_D$ and by another constant $K_A$, as shown in Expression 12. Equating Expressions 11 and 12 results in Expression 13 from which the value $K_A$ can be determined, as shown in Expression 14. The constant $K_D$ drops out.

The coefficient $K_A$ then represents a value by which the output of receiver/filter 260 can be multiplied in order to define the input signal to the receiver.

Once $K_A$ is computed, the modified ratio of maximum to minimum output values for the selected pair of antennas elements can be made with the use of Expressions 15, 16, and 17 of FIG. 11. Such modified ratio is then used, as discussed above, to access a given word location in a selected ROM which contains the angle of reception of the external signal.

Expressions 15 and 16 represent the direct received signal, as measured at the output of receiver/filter 360 (FIG. 13), of each antenna element of the diametrically opposed pair of antenna elements. More specifically, Expression 15 might represent the output of antenna element A3, for example, and Expression 16 the output of the oppositely positioned antenna element A7. Thus, the terms $S_x$ and $S_{x+4}$ designate the outputs of the oppositely positioned antenna elements A3 and A7. Expression 17 is the ratio of Expressions 15 and 16.

Referring again to FIG. 13, there is shown logic for implementing the computation of the calibration coefficient. In FIG. 13, one of the four inputs C1', C2', C3', or C4' to OR gate 621 will have become a high level signal during the counts C1 to C4 of counter 202 of FIG. 7 and will remain so during the count C5. Thus during the count C5 AND gate 623 will be enabled to produce an output which in turn will enable antenna elements A1, A3, A5, and A7 through OR gates 610, 611, 612, and 613, respectively. Simultaneously, C5 will disable A/D converter 106 and enable transmission gate 620 and buffer storage 624. Thus, the outputs of the enabled antenna elements A1, A3, A5, and A7 are supplied through diodes 253, 257, 254, and 258, respectively, to logic 631 which alternately connects the dummy load 636 and the antenna elements A1, A3, A5, and A7 to receiver/filter 360. Switching logic (MUX) 631 switches at a rate determined by output MUX A from MUX 204 which is supplied through AND gate 630 when it is primed by C5 being supplied to input 632 thereof. Specifically, when MUX A is high, switching logic 631 connects the dummy load 636 to the receiver/filter 360. When MUX A is low, switch 631 connects the output of antenna elements A1, A3, A5, and A7 to supply a full strength received signal to receiver/filter 360. Thus the input to receiver/filter 360 is alternately at full strength of the composite output from antenna elements A1, A3, A5, and A7 and at zero output when dummy load 636 is connected thereto.

Four antenna elements A1, A3, A5, A7, rather than only one, are employed during the computation of the calibration coefficients to insure, regardless of the reception angle of the external signal with respect to the antenna, that there will always be a sufficient signal generated in at least one of the four antenna elements on which to base a computation.

Thus, during the count C5, the computation of the calibration coefficient is effected in response to the output of receiver/filter 360 which is supplied through enabled transmission gate 620 to logic 622 for computing such calibration coefficient in accordance with the Expressions of FIGS. 10 and 11.

At the end of C5, buffer storage 624 is enabled to receive the newly computed calibration coefficient. Subsequently, during the next cycle, which includes counts C1–C4, the contents of buffer storage 624 are employed in ratio computer 212 to modify the computation of the ratios R1, R2, R3, and R4, received from the outputs of OR gates 208 and 210 of FIG. 7. It is to be understood that the logic between A/D converter 106 and OR gates 208, 210, shown in FIG. 7, is not shown in detail in FIG. 13, although such logic is required to obtain the outputs of OR gates 208 and 210 in FIG. 13, as discussed in connection with FIG. 7.

Such logic is represented generally in FIG. 13 by blocks 646 and 648. Specifically, block 646 represents registers 280, 282, 284, and 286 of FIG. 7, and block 648 represents registers 281, 283, 285, and 287 of FIG. 7.

Figure 2:
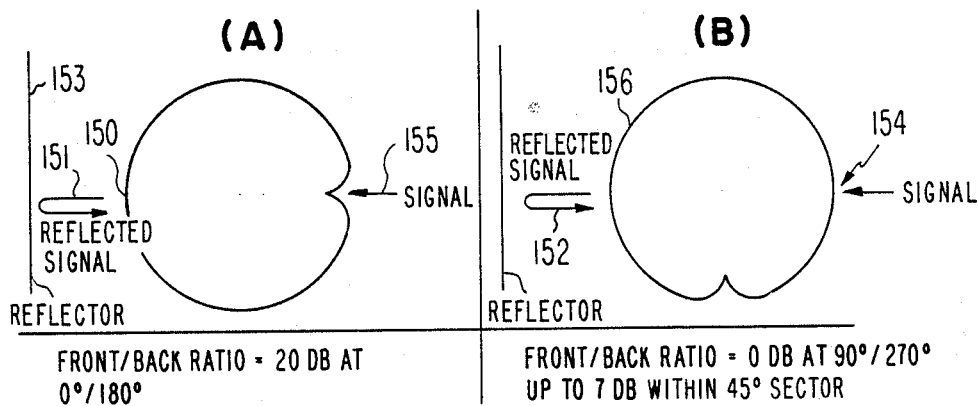
FIG. 2 shows two cardioid patterns rotated 45° with respect to each other and with respect to a received signal.

Referring again to FIG. 2, there is shown in (A) a reflected signal 151 which reflects off some reflecting surface 153 of the aircraft and is then received back by the antenna. Such reflected signal remains substantially constant over short periods of time and has an effect in accordance with the angular position of the cardioid 150. In FIG. 2(A) it can be seen that the reflected signal 151 is reflected back to the largest receiving portion of cardioid 150 and is added to the received signal represented by the arrow 155. In the case of complete reflection by surface 153, the reflected signal 151 will be received 20 dB stronger than the direct signal 155. When the cardioid of FIG. 2(A) is rotated by 180° the reflected signal 151 will also be added to the signal generated in the antenna by the received signal 155, but it will be 20 dB weaker than the direct signal 155. The variation in the reflected signal 151, as seen by the antenna, causes serious measurement errors.

With the present invention the variation in the reflected signal is effectively cancelled out due to the switching back and forth of the two antenna elements of each pair of antenna elements. This effect can be seen in portion (B) of FIG. 2 where the reflected signal 152 is added to the received signal 154 with about equal antenna gain. When the cardioid 156 is reversed the same direct signal and reflective signal will be received by the antenna. In both positions of the cardioid the received signal is distorted by the same amount of reflective signal and is thereby, in effect, cancelled out. Thus, the switching back and forth of the cardioid removes the effect of the reflected signal and accordingly improves the integrity of the system.

Figure 14:
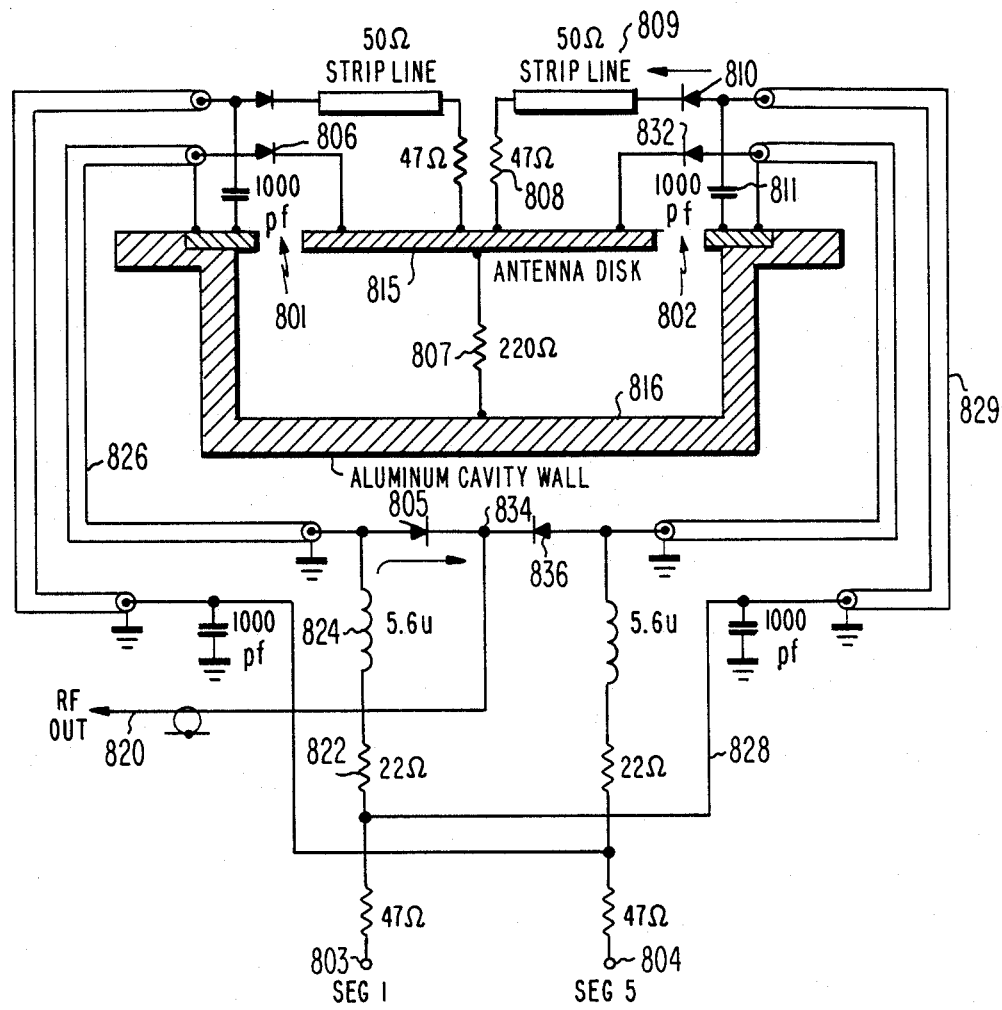
FIG. 14 is a combination structural side view and schematic diagram of the overall antenna system but showing only one pair of oppositely positioned antenna elements.
Figure 15:
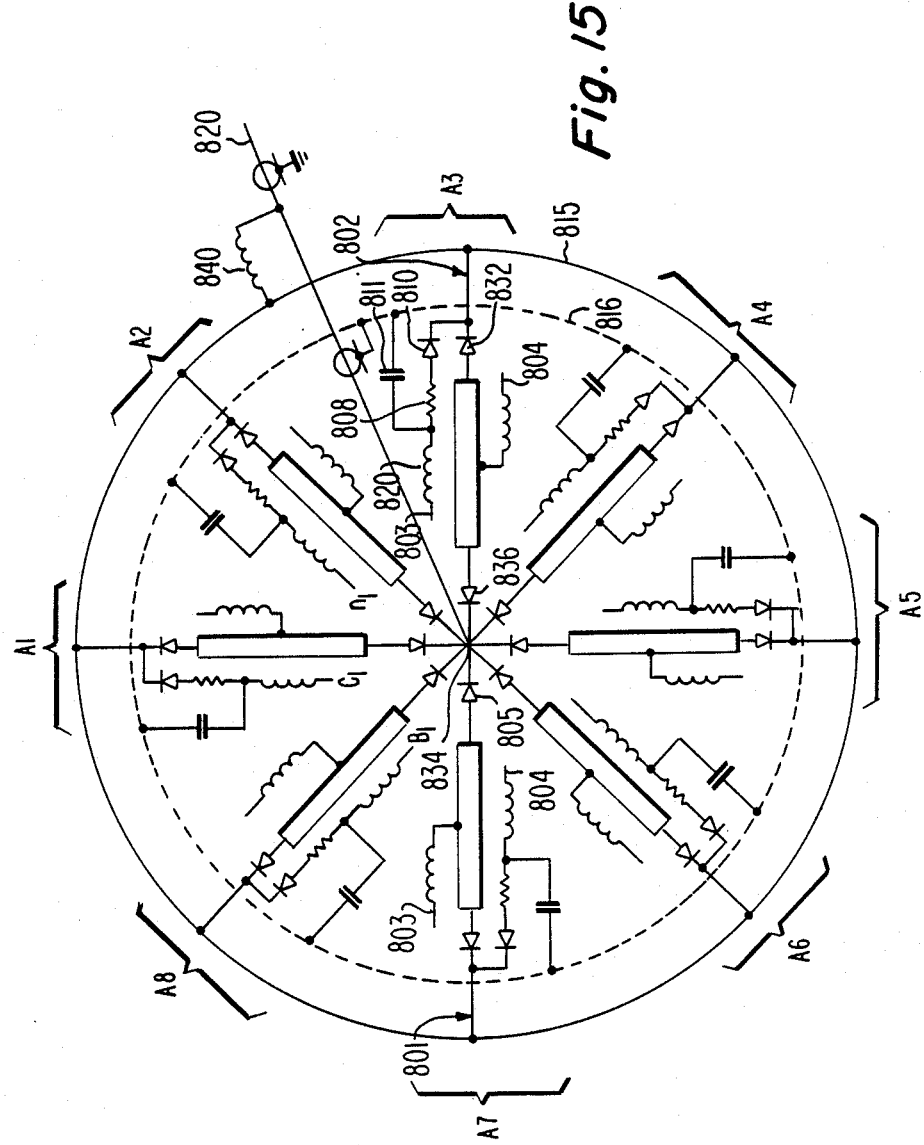
FIG. 15 is combination schematic diagram of the overall antenna system of FIG. 14.

Referring now to FIGS. 14 and 15, there is shown in FIG. 14 a sectioned side view of the antenna with associated circuitry which can be employed in the present invention and in FIG. 15 an equivalent schematic diagram of the antenna which is manufactured by the Collins Radio Division of the Rockwell International Corporation.

In FIG. 14, a cavity backed disc 815 is connected via resistor 807 to an aluminum cavity wall 816 which forms a reference potential plane for the antenna disc 815. A series of eight slots, such as slots 801 and 802, are formed annularly around antenna disc 815 to form eight separate points at which the antenna can be either fed or terminated. The eight annular slots are formed into the four diametrically positioned pairs of antenna elements discussed herein. For example, the two slots 801 and 802 form one diametrically oppositely positioned pair of annular slot antenna elements. It is a known property of an annular slot antenna, such as shown in FIG. 14, that if one such annular slot antenna element is terminated in its characteristic impedance and the annular slot antenna element positioned diametrically opposite the terminated antenna element is properly supplied with an input signal, the radiation pattern of the pair of antenna elements approximates a cardioid. Thus, if the antenna element represented by slot 802 is terminated in its characteristic impedance, and the antenna element represented by slot 801 is fed by an appropriate signal, the pair of slot antenna elements 801 and 802 will generate a radiation pattern approximating a first cardioid pattern.

If the antenna represented by slot 801 is then terminated in its characteristic impedance and the antenna represented by slot 802 is fed by an appropriate signal, the pair of slot antenna elements 802 and 801 will generate a radiation pattern approximating a cardioid pattern 180° removed from the first cardioid pattern. Thus the cardioid pattern will switch back and forth by 180° if the two antennas represented by slots 801 and 802 are alternately energized in the manner described above.

Energization of slot antenna element 801 and concurrent termination of slot antenna element 802 in its characteristic impedance is accomplished by simultaneously supplying a high level signal to input terminal 803 and a low level signal to input terminal 804 of FIG. 14. The high level input signal on input terminal 803 will pass through resistors 860 and 822 and inductor 824 to cause both diodes 805 and 806 to become conductive, thereby permitting the energy generated in slot antenna 801 to pass through conductive diode 806, which is shielded by shielding means 826, and then back through diode 805 to the RF output terminal 820.

Simultaneously, the high level signal on input terminal 803 will pass through lead 828 to cause diode 810 to become conductive, thereby permitting the radiation energy which would otherwise be developed in slot antenna element 802 to be conducted through capacitor 811, diode 810, stripline 809, and resistor 808, to the aluminum cavity wall 816, thereby effectively grounding out such radiation.

The low level signal, which is also simultaneously supplied to input terminal 804, functions to make diode 832 non-conductive, thereby further preventing any radiation energy being generated by slot antenna 802.

By reversing the signals on input terminals 803 and 804, i.e., supplying a high level signal to terminal 804 and a low level signal to terminal 803, the operation of the system is reversed so that slot antenna 802 is activated and slot antenna 801 is terminated in its characteristic impedance.

Referring now to FIG. 15 there is shown an equivalent circuit diagram of the entire antenna array, i.e., with all eight of the antenna elements A1 through A8 being illustrated. Oppositely positioned pairs of antenna elements operate together in the manner described above. For example, antenna elements A3 and A7 function together to produce a cardioid pattern which flips back and forth 180° out of phase for a portion of the rotational cycling of the four pairs of antenna elements.

The circuit components of antenna elements A3 and A7, which correspond to the antenna elements described above in connection with FIG. 14, are identified by the same reference characters. In addition, the impedance element 820 in FIG. 15 extends from one side of capacitor 811 back to input terminal 803 of FIG. 14 and corresponds generally to the resistor 860 of FIG. 14. The impedance 840 of FIG. 15 represents those impedance components coupling the antenna disc 815 to RF output 820, which are not in fact discrete circuit components. In other words, the impedance 840 generally represents interelectrode capacitances and inductances inherent in a system employing high frequency signals.

What is claimed is:

1. An automatic direction finder (ADF) antenna system for automatically determining the direction of a received external signal in a 360° field and comprising:
   a plurality of antenna elements arranged radially from a common center and each constructed to form a cardioid radiation pattern when energized, with the major axis of the cardioid pattern extending from said common center radially outward along the radiating axis of the antenna element generating the cardioid pattern;
   first switching means for sequentially selecting, in a predetermined order and for a predetermined time period T, successive pairs of a plurality of pairs of radially oppositely positioned antenna elements;
   second switching means for alternately energizing the two antenna elements of each pair of oppositely positioned pairs of antenna elements during the time period T when said each pair is being selected by said first switching means;
   first means for determining the particular pair of oppositely positioned antenna elements, AX and AY, generating the smallest difference in output signals as said particular pair of antenna elements is switched by said second switching means and also for determining the ratio R of the output signals of antenna elements AX and AY;
   second means for determining the antenna element AZ producing the largest output signal VZ, when energized; and
   third means responsive to the determination of antenna elements AX, AY, and AZ and to R for determining the angular direction of reception of said received signal.

2. An ADF system as in claim 1 in which said third means comprises:
   a plurality of memories each containing a data word defining a specific angular position of a received signal within a predetermined arcuate segment of said 360° field corresponding to the determination of AZ and the antenna element AX or AY having the larger output signal, when energized;
   fourth means for selecting the particular memory segment corresponding to a particular combination of AZ and the antenna element AX or AY having the larger output signal, when energized; and
   fifth means responsive to R for selecting the word location in memory containing the data word most clearly defining the angular direction of reception of the received signal.

3. An improved automatic direction finder antenna system for automatically determining the direction of a received external signal and comprising:
   N pairs of antenna elements with the elements of each pair extending functionally in opposite radial directions from a common central point and with each pair of antenna elements, when energized, being the primary receiver of the received signal over a predetermined angular segment of the total 360° of possible reception;
   first means for energizing, over successive time intervals, successive pairs of said antenna elements;
   second means for alternately energizing the antenna elements of each pair of antenna elements during the time interval that such pair of antenna elements is energized to alternately produce a pair of mirrored cardioid radiation patterns;
   third means for determining which pair of antenna elements produces the lowest ratio R of the output signals on the two antenna elements thereof of any of the pairs of antenna elements in response to the received external signal and while being alternately energized;
   fourth means for determining which antenna element produces the largest output signal in response to the received external signal;
   a plurality of ROMS individually containing data words defining the angular direction within one of said angular segments; and
   logic means for determining the specific angular segment corresponding to the pair of antenna elements which is the primary receiver of said external signal to select the corresponding one of said plurality of ROMS;
   said selected ROM responsive to said lowest R value to output a data word defining the angular position of reception of said external signal.

4. A method for automatically determining the direction of reception of an external signal by an automatic direction finding antenna system comprising the steps of:
   arranging a plurality of antenna elements so they each generate, when energized, cardioid patterns of radiation extending outwardly from a common center and in predetermined angular positions with respect to said common center to define angular segments for which each antenna element is the primary receiver of an external signal;

selecting pairs of oppositely positioned antenna elements in a predetermined sequence each for a period of time T;

alternately energizing the two antenna elements of each pair of oppositely positioned antenna elements when they are selected to produce a two level signal having a ratio RX of the high to low level values of said two level signal;

determining which value of RX is the lowest and the particular pair of oppositely positioned antenna elements AX and AY which produces such lowest value RL of RX;

determining which antenna element AZ, when energized, produces the largest output signal VL; and determining the angle of reception of said external signal in response to the determination of AX, AY, AZ, and RL.

5. A method for automatically determining the direction of reception of an external signal comprising the steps of:

arranging N antenna means in a manner to generate N cardioid reception patterns, one such pattern being generated in response to the energizing of one antenna means, and with the axes of such cardioid patterns extending radially from a common center and spaced apart by a predetermined angular distance;

selecting pairs of oppositely positioned antenna means in a predetermined sequence;

alternately energizing the two antenna means of each selected pair of oppositely positioned antenna means to produce a two level signal;

determining which of said two level signals has the lowest ratio RL of its two levels and which pair of antenna means AX and AY produces RL;

determining the particular antenna means AZ producing the largest output signal when energized and which of antenna means AX and AY produces the larger output signal; and interpreting AX, AY, AZ, and RL to determine the angle of reception of the received external signal.

6. An automatic direction finder (ADF) antenna system for automatically determining the direction of a received external signal and comprising:

a plurality of antenna elements arranged radially from a common center and each constructed to form a cardioid radiation pattern when energized, with the major axis of the cardioid pattern extending from said common center radially outward along the radiating axis of the antenna element generating the cardioid pattern;

switching means for alternately energizing successive pairs of oppositely positioned antenna elements of said plurality of antenna elements to produce a two level signal from each pair of oppositely positioned antennas, with each pair being so alternately energized for a time period T;

first means for determining which antenna element AX has an output signal DX which is greater than, but bears the smallest ratio R to, the output signal DY of its oppositely positioned antenna element AY;

second means for determining which antenna element AZ generates the largest output signal VZ of all of the antenna elements when they are energized; and third means responsive to the various combinations of the determinations of AX, AZ, and R for determining the angular direction of reception of said received signal.

7. An ADF system as in claim 6 in which said third means comprises:

a plurality of memories each containing a plurality of word locations with each word location containing a data word defining an angular position of a received signal within a predetermined arcuate segment of said 360° field corresponding to the determination of AZ and the antenna element AX or AY having the larger output signal, when energized;

fourth means for selecting the particular memory segment corresponding to a particular combination of AZ and the antenna element AX or AY having the larger output signal, when energized; and fifth means responsive to R for selecting the word location in memory containing the data word most closely defining the angular direction of reception of the received signal.

8. A method for automatically determining the direction of reception of an external signal by an automatic direction finding antenna array system comprising the steps of:

a—arranging a plurality of antenna elements so they each generate, when energized, cardioid patterns of radiation extending outwardly from a common center and in predetermined angular positions with respect to said common center to define angular segments for which said each antenna element is the primary receiver of an external signal;

b—selecting pairs of oppositely positioned antenna elements in a predetermined sequence each for a period of time T;

c—alternately energizing the two antenna elements of each pair of oppositely positioned antenna elements when they are selected to produce a two level signal having a ratio RX of the high to low level values of said two level signal;

d—determining which antenna element AX produces, when energized, a signal level which is greater than the signal level produced by its oppositely positioned antenna element but which bears a ratio R to the signal level produced by its oppositely positioned antenna element which is smaller than the corresponding ratios of all of the other pairs of antenna elements;

e—determining which antenna element AZ, when energized, produces the largest output signal VZ of all of said antenna elements; and f—determining from AX, AZ and R the angular direction of reception of said received signal.

9. A method as in claim 8 in which step f further comprises the steps of:

selecting the particular angular segment defined by the particular combination of AX and AZ which includes the angle of reception of the received signal; and selecting a specific angular portion of said particular angular segment in accordance with the value of R to more closely define the angle of reception of said received signal.

10. A method as in claim 8 in which step f further comprises the step of:

selecting a memory having a plurality of word locations each containing a data word defining a small angular division which collectively define the angular segment defined by the particular combination of AX and AZ and which includes the angle of reception of the received signal; and selecting a specific angular division of said given angular segment in accordance with the value of R to define the angle of reception of said received signal.

11. An automatic direction finder antenna system for automatically determining the direction of a received external signal and comprising:

a plurality of antenna elements each constructed to form a cardioid radiation pattern when energized, with the major axis of the cardioid pattern extending from a common center radially outward along the radiating axis of the antenna element generating the cardioid pattern;

first switching means for sequentially selecting, in a predetermined order and each for a predetermined time period T, successive pairs of oppositely positioned antenna elements of said plurality of antenna elements;

second switching means for alternately energizing the two antenna elements of each pair of oppositely positioned antenna elements during the time period T when said each pair is being selected by said first switching means;

first means for determining which antenna element AX produces, when energized, a signal level which is greater than the signal level produced by its oppositely positioned antenna element but which bears a ratio R to the signal level produced by its oppositely positioned antenna element which is smaller than any of the corresponding signal level ratios of any of the other pairs of antenna elements;

comparator means for determining which antenna element AZ, when energized, produces the largest output signal VZ of all of said antenna elements; and second means for determining from AX, AZ, and R the angular direction of reception of said received signal.

* * * * *